US009368299B1

United States Patent
Chou

(10) Patent No.: US 9,368,299 B1
(45) Date of Patent: *Jun. 14, 2016

(54) THIN KEYBOARD HAVING KEYCAPS INCLUDING INTEGRATED INNER FRAMES

(71) Applicant: ZIPPY TECHNOLOGY CORP., New Taipei (TW)

(72) Inventor: Chin-Wen Chou, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/611,575

(22) Filed: Feb. 2, 2015

(51) Int. Cl.
*G06F 3/02* (2006.01)
*H01H 13/705* (2006.01)
*H01H 13/7073* (2006.01)

(52) U.S. Cl.
CPC ......... *H01H 13/7073* (2013.01); *G06F 3/0202* (2013.01); *H01H 13/705* (2013.01); *H01H 2221/044* (2013.01); *H01H 2221/054* (2013.01); *H01H 2221/09* (2013.01); *H01H 2227/036* (2013.01)

(58) Field of Classification Search
CPC ............. G06F 3/0202; H01H 2221/09; H01H 2221/044; H01H 2207/03; H01H 13/7073; H01H 2221/054; H01H 13/705; H01H 2227/036
See application file for complete search history.

(56) References Cited

U.S. PATENT DOCUMENTS

| 4,315,114 A * | 2/1982 | Monti, Jr. ............. | H01H 13/705 200/343 |
| 6,821,036 B2 * | 11/2004 | Horiuchi ............... | G06F 1/1616 400/472 |
| 8,212,167 B2 * | 7/2012 | Chen ..................... | H01H 13/705 200/344 |
| 2009/0178912 A1 * | 7/2009 | Chen ................... | H01H 13/7073 200/5 A |
| 2014/0027259 A1 * | 1/2014 | Kawana ............... | H01H 13/705 200/517 |
| 2014/0284193 A1 * | 9/2014 | Chou ................... | H01H 13/705 200/5 A |
| 2015/0185862 A1 * | 7/2015 | Chen ..................... | G06F 3/0202 361/679.08 |

FOREIGN PATENT DOCUMENTS

| JP | 2005116326 A | * 4/2005 |
| TW | 445471 | 7/2001 |
| TW | I220213 | 8/2004 |
| TW | M346861 | 12/2008 |
| TW | M419973 | 1/2012 |
| TW | M426075 | 4/2012 |
| TW | M434979 | 8/2012 |

* cited by examiner

*Primary Examiner* — Daniel J Colilla
(74) *Attorney, Agent, or Firm* — Muncy, Geissler, Olds & Lowe, P.C.

(57) ABSTRACT

A thin keyboard depressing structure includes a circuit board and a frame. The circuit board includes a plurality of trigger portions each can be triggered to generate a keyboard signal. The frame is stacked over the circuit board and forms an outer frame, a plurality of inner frames and a plurality of keycaps in an integrated manner. The outer frame has a plurality of holding zones corresponding to the trigger portions. Each keycap is held in one holding zone corresponding to one trigger portion. The outer frame and the keycap are bridged by one inner frame. Each inner frame has at least two first connecting portions connected to the outer frame and at least two second connecting portions connected to the keycap. Each first connecting portion and each second connecting portion are bridged by a support portion.

11 Claims, 6 Drawing Sheets

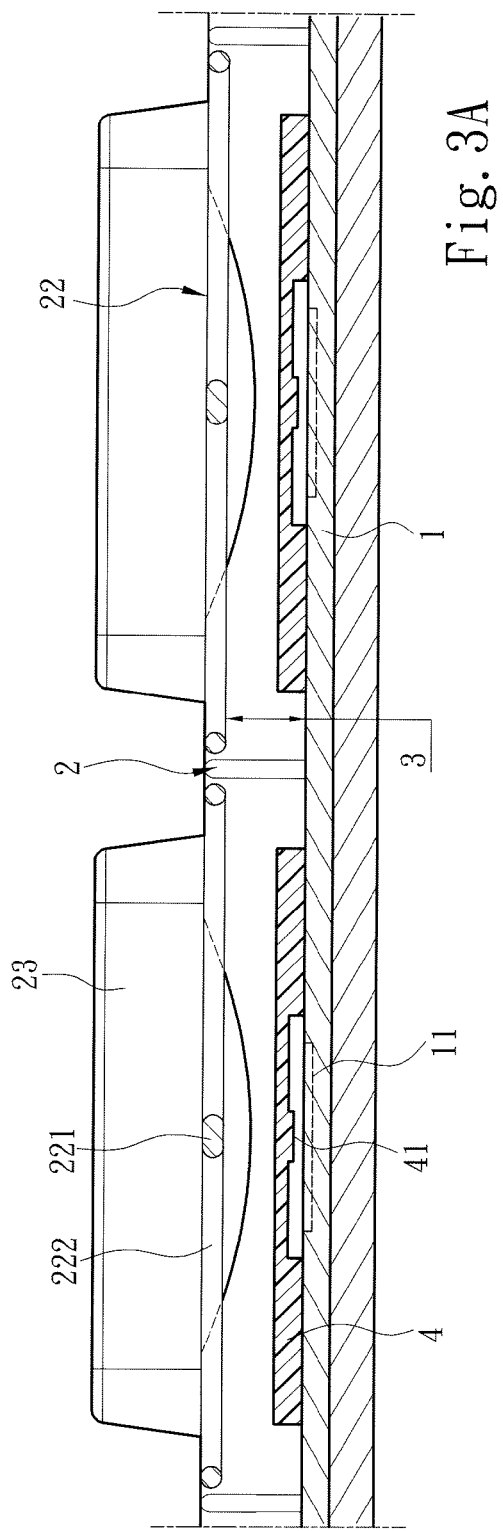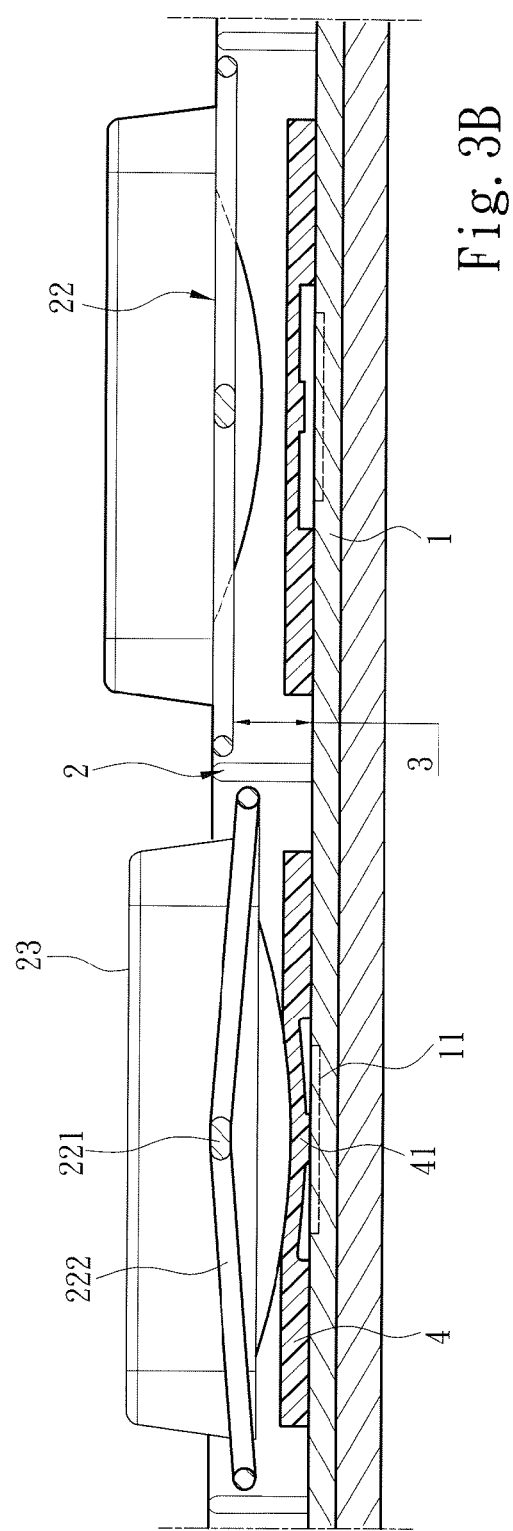

THIN KEYBOARD HAVING KEYCAPS INCLUDING INTEGRATED INNER FRAMES

FIELD OF THE INVENTION

The present invention relates to a thin keyboard depressing structure and particularly to a keyboard depressing structure equipped with a support structure consisting of an inner frame and an outer frame to replace a conventional keycap link movement mechanism.

BACKGROUND OF THE INVENTION

Conventional keyboards such as those disclosed in Taiwan Patent Nos. 445471, I220213 and M346861 generally include a keycap, a circuit board triggered by the keycap to generate a command signal, a baseboard located at one side of the circuit board and a link movement mechanism with two ends to bridge the keycap and the baseboard. The keycap is depressible to move towards the circuit board. The link movement mechanism is compressed downwards to press and set on a circuit switch on the circuit board to generate a corresponding control signal. If the keycap is not depressed to move towards the circuit board the link movement mechanism provides a return elastic force to push the keycap in normal conditions to move away from the circuit board at a selected elevation. While the aforesaid conventional keyboard structure can achieve the object of command input, it is constrained by the height of the link movement mechanism that makes the keyboard thicker. In view of the prevailing trend on the requirement of computer design that makes thin and lighter weight of products the main appeal, especially notebook computers, the thickness ratio of keyboard module is the main factor affecting the total thickness of the notebook computers. Hence all producers have devoted a great deal of efforts trying to make the keyboard structure thinner to reduce the total thickness.

In order to overcome the aforesaid problem, some producers have proposed another keyboard design, such as Taiwan Patent No. M434979 which provides a V-shaped structure consisting of a first support member and a second support member to solve the thickness problem resulting from the X-shaped structure of the conventional link movement mechanism; or Taiwan Patent No. M419973 which has an extensible lift structure located between the keycap and the circuit board to replace the conventional link movement mechanism to facilitate miniaturization; or Taiwan Patent No. M426075 which has a first support member and a second support member around the keycap to replace the conventional link movement mechanism to reduce total thickness of the keyboard. Although the aforesaid techniques can reduce the total thickness of the keyboard, they merely implement the link movement mechanism in other forms, thus the keyboard structure still has a certain thickness. Moreover, the structures they provided are difficult to make and assemble.

SUMMARY OF THE INVENTION

The primary object of the present invention is to overcome the thinning problem occurred to the conventional keyboard structure.

To achieve the foregoing object the present invention provides a thin keyboard depressing structure that includes a circuit board and a frame. The circuit board has a plurality of trigger portions each can be triggered to generate a keyboard signal. The frame is stacked over the circuit board and includes an outer frame, a plurality of inner frames and a plurality of keycaps that are formed in an integrated manner. The outer frame has a plurality of holding zones corresponding to the trigger portions. Each keycap is located in one holding zone corresponding to one trigger portion. The outer frame and the keycap are bridged by one inner frame. Each inner frame has at least two first connecting portions connected to the outer frame and at least two second connecting portions connected to the keycap. Each first connecting portion and each second connecting portion are bridged by a support portion which can generate a deformation elastic force when the keycap is moved to the trigger portion.

In one embodiment the keycaps are held horizontally or vertically in the holding zones, and the frame has a support rib interposed between two abutting holding zones.

In another embodiment the two first connecting portions are located at two opposite sides of the keycap, and the two second connecting portions are located at other two opposite sides of the keycap.

In yet another embodiment each first connecting portion is formed at a width gradually increased from the junction of the first connecting portion and the outer frame toward the support portion.

In yet another embodiment each second connecting portion is formed at a width gradually shrunk from the junction of the second connecting portion and the support portion toward the keycap.

In yet another embodiment each first connecting portion is located at one side of the keycap and each second connecting portion is located at one corner of the keycap.

In yet another embodiment the support portion of the inner frame is formed to mate the profile of the keycap.

In yet another embodiment each first connecting portion and each second connecting portion are located at a same elevation.

In yet another embodiment each keycap and the circuit board are interposed by a movement interval which has an elastic support member located therein to aid movement of the keycap relative to the circuit board.

In yet another embodiment each trigger portion includes a primary trigger switch and a plurality of secondary trigger switches that are electrically connected to each other, and each elastic support member has a plurality of contact portions corresponding respectively to the primary trigger switch and the secondary trigger switches.

By means of the construction set forth above, compared with the conventional keyboards, the invention provides advantageous features as follow:

1. Total thickness of the keyboard can be reduced to make the keyboard thinner. The invention, through the outer frame and the inner frames formed on the frame to support each keycap, allows the keycap to be held in the holding space of the frame and moved reciprocally, hence the keycap link movement mechanism used in the conventional keyboard can be dispensed with.

2. Since the conventional keycap link movement mechanism is no longer needed in the invention, total structure of the keyboard is simpler and assembly is easier without the need of complicated alignment and positioning.

The foregoing, as well as additional objects, features and advantages of the invention will be more readily apparent from the following detailed description, which proceeds with reference to the accompanying drawings.

BRIEF DESCRIPTION OF THE DRAWINGS

FIG. 3A is a sectional view taken on line A-A in FIG. 1 showing the keycap without being depressed.

FIG. 3B is a sectional view taken on line A-A in FIG. 1 showing the keycap in a depressed condition.

DETAILED DESCRIPTION OF THE PREFERRED EMBODIMENTS

Figure 1:
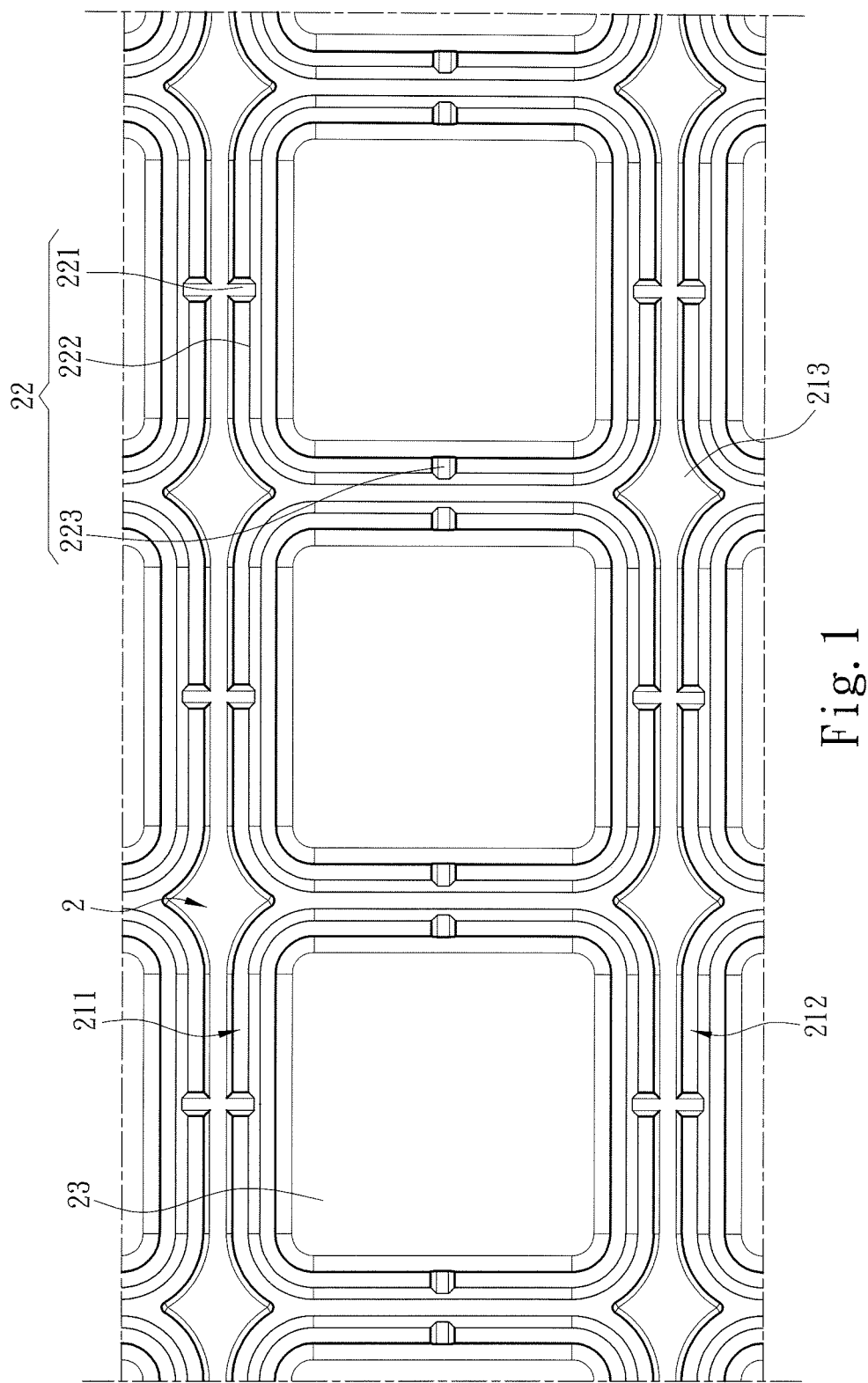
FIG. 1 is a top view of the keyboard frame of a first embodiment of the invention.
Figure 2:
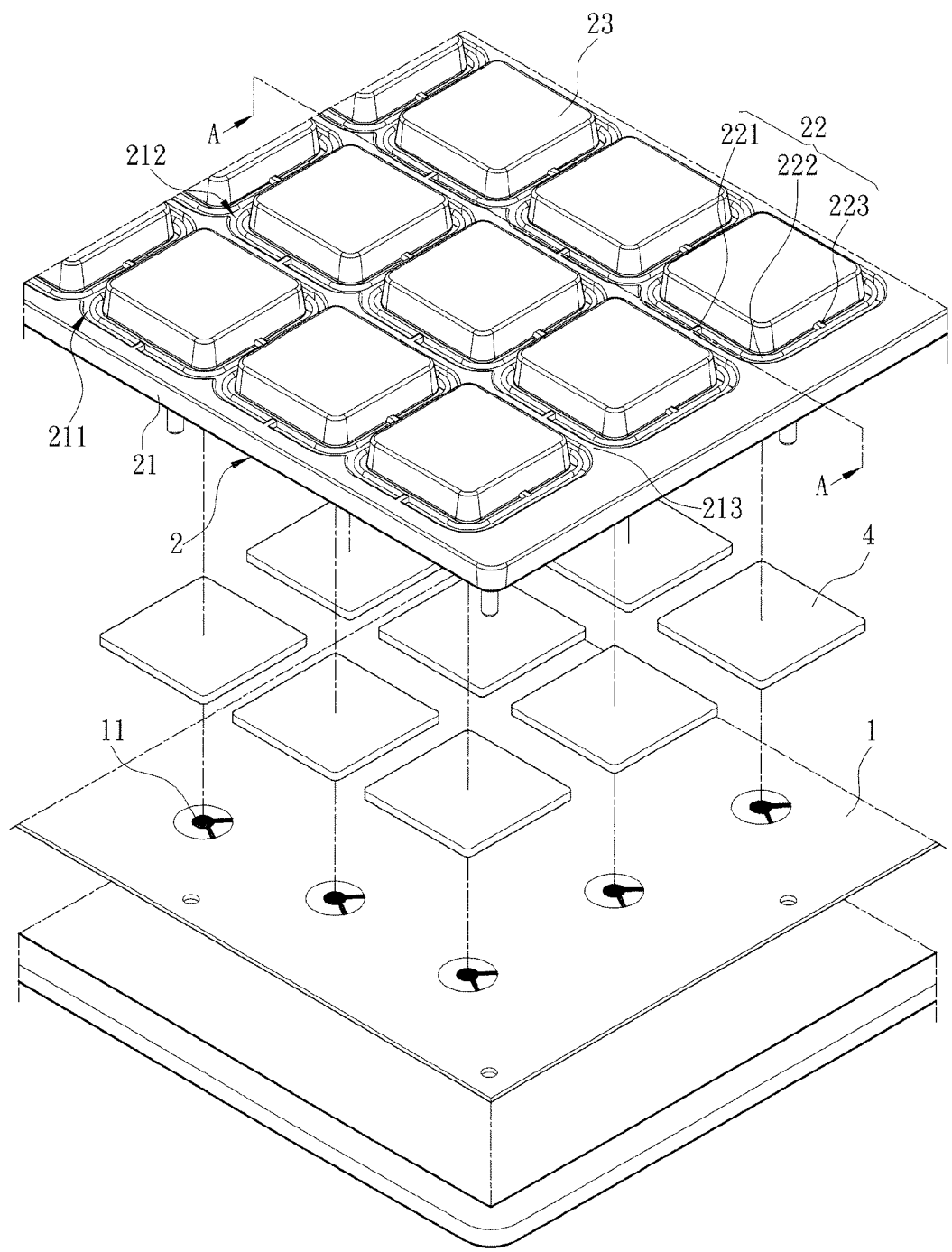
FIG. 2 is an exploded view of the structure of the first embodiment of the invention.

Please referring to FIGS. 1 through 3A, the present invention aims to provide a thin keyboard depressing structure to save the link movement mechanism used in the conventional keyboard structure to reduce total thickness of the keyboard and make the structure simpler. The depressing structure of the invention includes at least one circuit board 1 and a frame 2. The circuit board 1 has a plurality of trigger portions 11 each can be triggered to generate a keyboard signal. In one embodiment the circuit board 1 is made in a multi-laminate or a single laminate fashion. Each trigger portion 11 further can be an electrode structure configured and laid on the circuit board 1. The frame 2 is stacked over the circuit board 1 and fixedly mounted thereon. In this invention the frame 2 can be integrally made from plastics through a mechanical fabrication process. The frame 2 includes an outer frame 21, a plurality of inner frames 22 and a plurality of keycaps 23 that are formed in an integrated manner. The outer frame 21 further is coupled with the circuit board 1 or a keyboard casing (not shown in the drawings), and has a plurality of holding zones 211 and 212 to hold the keycaps 23 corresponding to the trigger portions 11. Each holding zone 211 can be designed and made to mate merely one trigger portion 11 according to requirements, or mate a plurality of trigger portions 11. In another embodiment each of the holding zones 211 and 212 can hold one keycap 23 horizontally or vertically. The outer frame 21 also has a support rib 213 to bridge two abutting holding zones 211 and 212 to separate the holding zones 211 and 212 and confine movement range of each keycap 23. In addition the support rib 213 also can be connected to the inner frame 22.

Thus, each keycap 23 is held in one corresponding holding zone 211 which is connected to the inner frame 22 to get support therefrom. More specifically, each inner frame 22 is mating only one of the keycaps 23, namely, each inner frame 22 supports merely one keycap 23. Each inner frame 22 has at least two first connecting portions 221 connected to the outer frame 21 and at least two second connecting portions 223 connected to the keycap 23, and each first connecting portion 221 and each second connecting portion 223 are bridged by a support portion 222 which can generate a deformation elastic force when the keycap 23 is moved to the trigger portion 11. Furthermore, the first connecting portion 221 is located at one side of the support portion 222 facing the outer frame 21, and the second connecting portion 223 is located at another side of the support portion 222 facing the keycap 23. Moreover, the two first connecting portions 221 are located at two opposite sides of the keycap 23, and the two second connecting portions 223 are located at two other opposite sides of the keycap 23. In yet another embodiment each first connecting portion 221 and each second connecting portion 223 are positioned in a staggered manner against the support portion 222, as shown in FIG. 1. In yet another embodiment the support portion 222 can be formed to mate the profile of the keycap 22, namely, the support portion 222 can be formed by mating the profile of the keycap 22, and each first connecting portion 221 and each second connecting portion 223 are located at a same elevation, namely, the keycap 23 supported by the support portion 222 without being depressed is positioned horizontally.

Please referring to FIGS. 3A and 3B, during implementation of the depressing structure of the invention, first, provide the frame 2 with each keycap 23 mating each trigger portion 11 on the circuit board 1; next, stack the frame 2 over the circuit board 1 to finish assembly. As the frame 2 has a definite height, a movement interval 3 is formed between the keycap 23 and the circuit board 1, namely, when the keycap 23 is not being depressed it is separated and spaced from the trigger portion 11 without triggering. When the keycap 23 is depressed under a force it is moved toward the trigger portion 11, and the inner frame 22 has the first connecting portion 221 functioned as a support spot and the second connecting portion 223 functioned as a force applying spot so that the support portion 222 generates a deformation elastic force, and the keycap 23 is moved to the trigger portion 11 and triggers thereof to generate the keyboard signal, as shown in FIG. 3B. When the force applied on the keycap 23 is absent the inner frame 22 no longer receives the force and returns to the original condition before depressing.

In another embodiment an elastic support member 4 is provided in the movement interval 3 to aid movement of the keycap 23 against the circuit board 1. The elastic support member 4 can be an elastic reed or an elastic sponge. Furthermore, the elastic support member 4 has a contact portion 41 corresponding to each trigger portion 11. The contact portion 41 is not in contact with the trigger portion 11 when the elastic support member 4 is not being depressed. But when the elastic support member 4 is depressed by the keycap 23 and deforms the contact portion 41 connects the trigger portion 11 to generate the keyboard signal.

Figure 4:
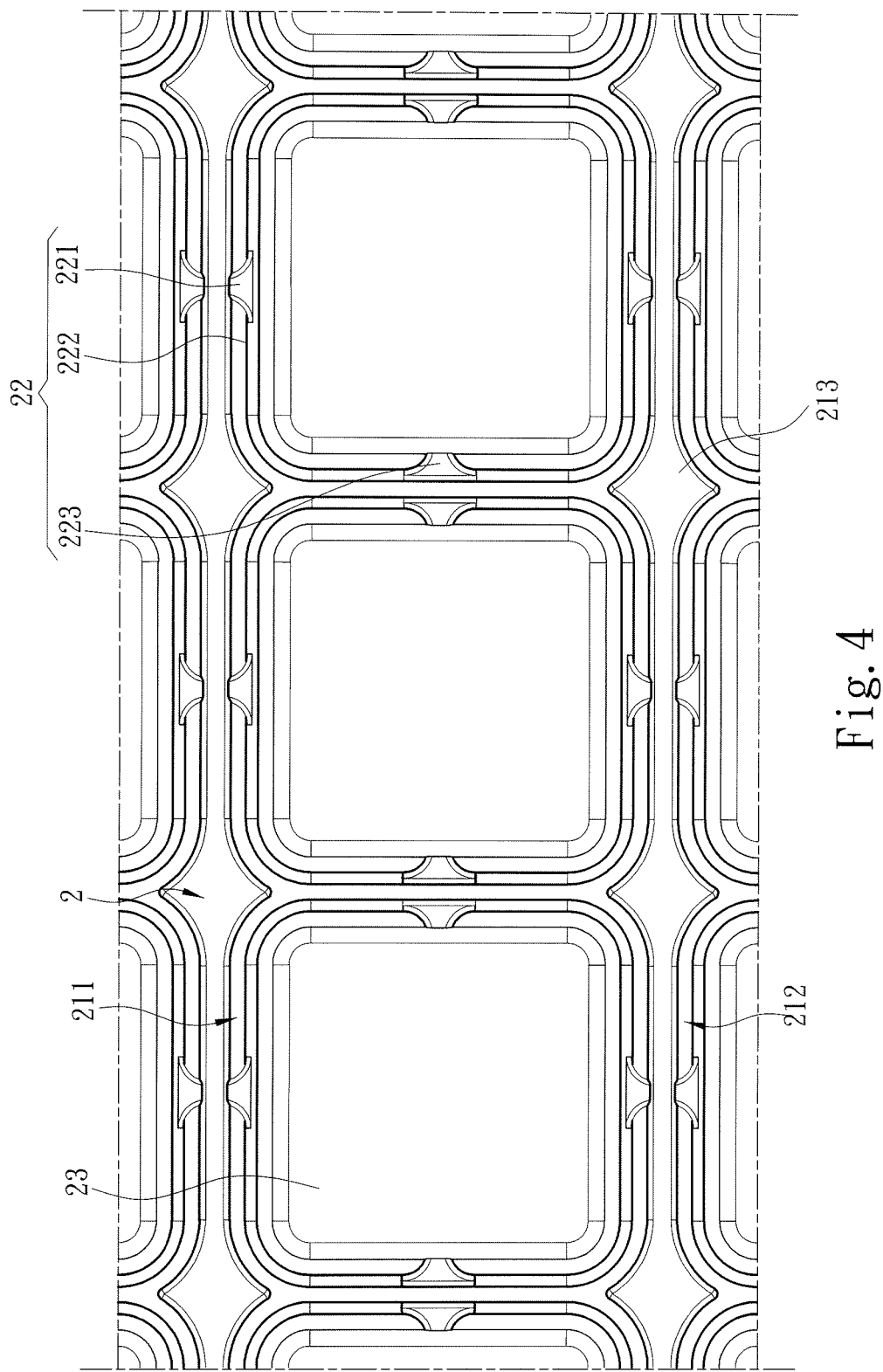
FIG. 4 is a top view of the keyboard frame of a second embodiment of the invention.
Figure 5:
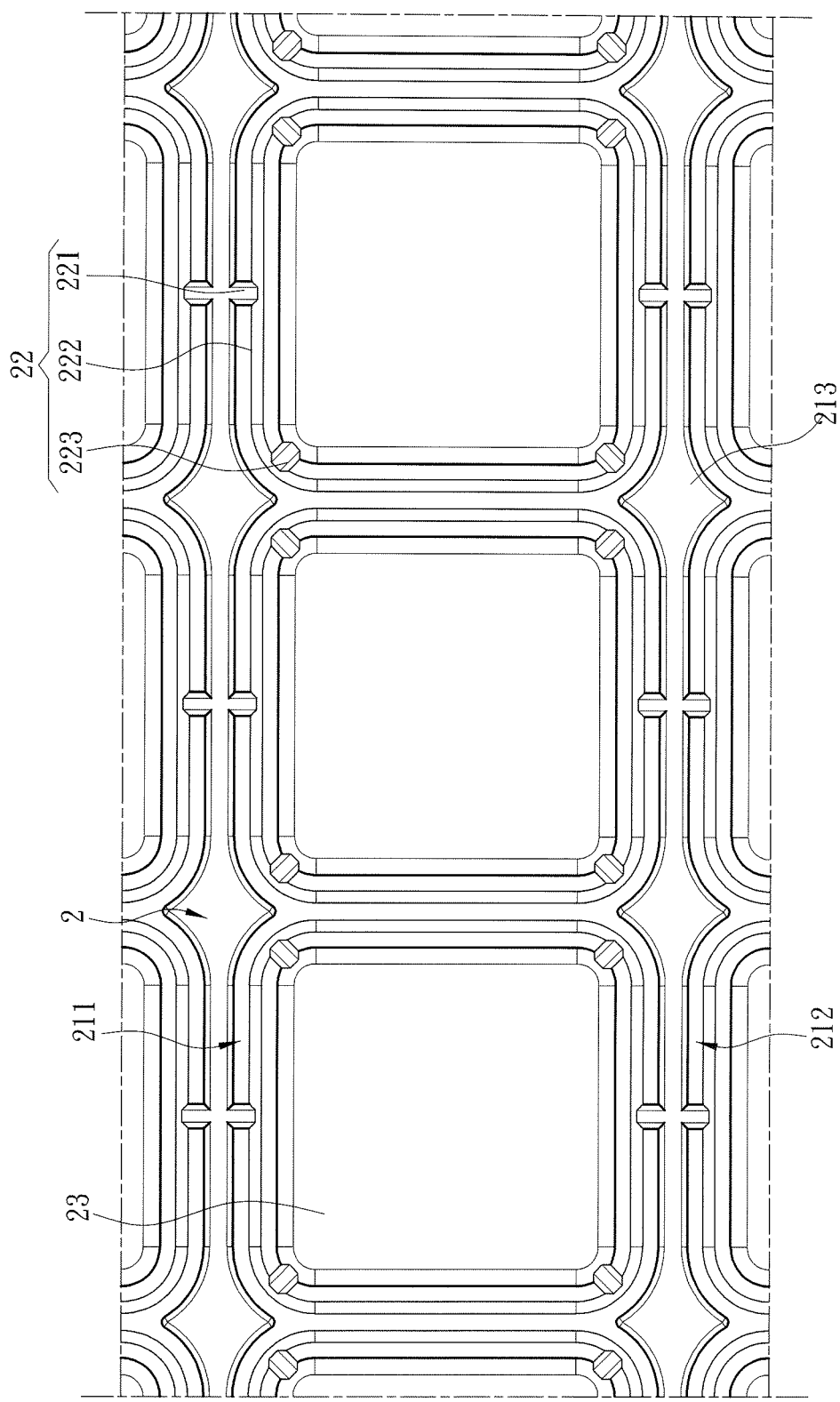
FIG. 5 is a top view of the keyboard frame of a third embodiment of the invention.

In addition, in order to enhance the structural strength of the invention, during forming of the inner frame 22 on the frame 2 the width of each first connecting portion 221 increases gradually from the junction of the first connecting portion 221 and the outer frame 21 toward the support portion 222 as shown in FIG. 4. On the other hand, during forming of each second connecting portion 223 its width gradually shrinks from the junction of the second connecting portion 223 and the support portion 222 toward the keycap 23. Also referring to FIG. 1, in that embodiment each second connecting portion 223 is located at one side of the keycap 23. Aside from the embodiment previously discussed, each second connecting portion 223 also can be located at one corner of the keycap 23 as shown in FIG. 5.

Figure 6:
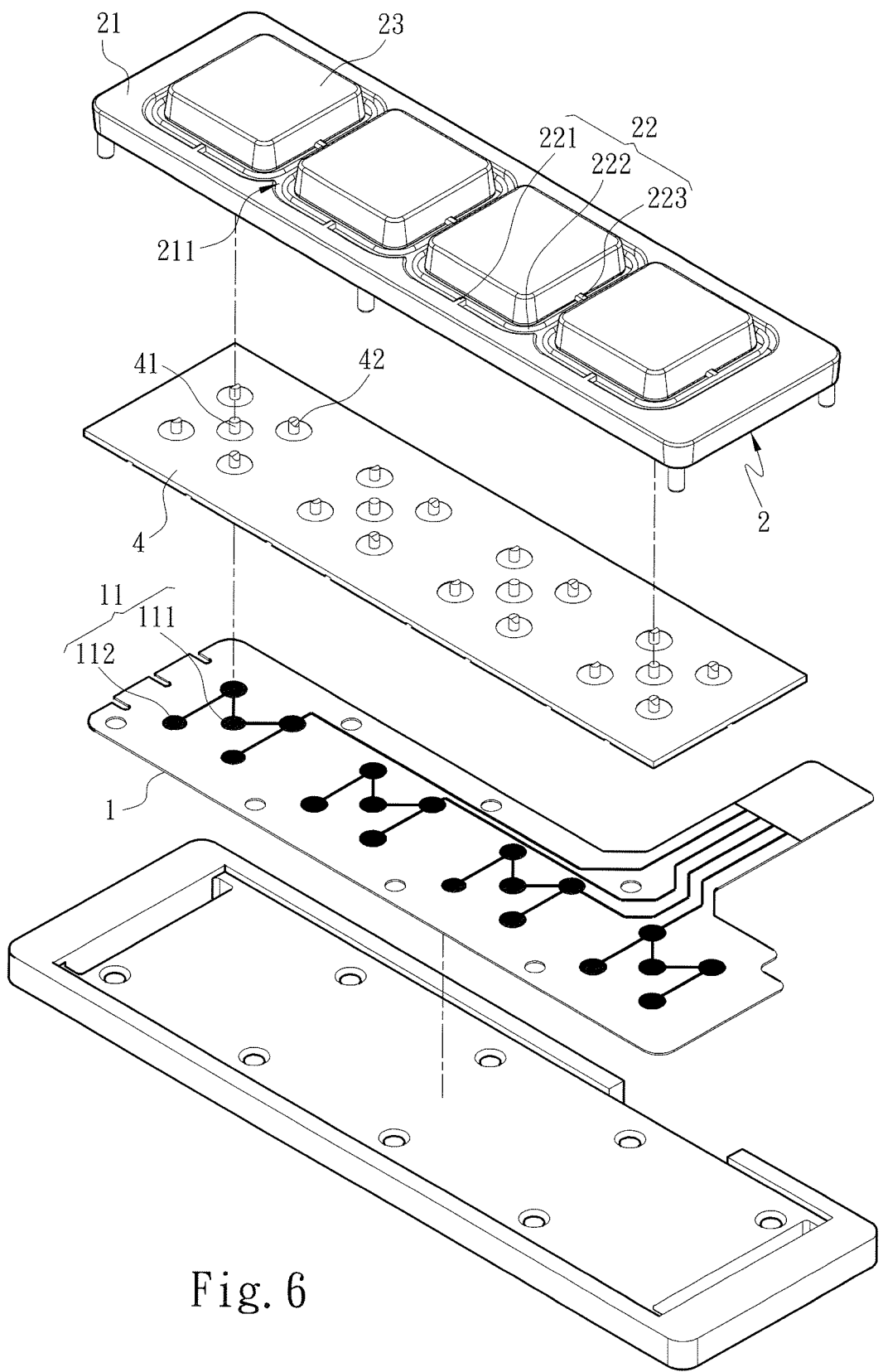
FIG. 6 is an exploded view of the structure of a fourth embodiment of the invention.

Please referring to FIG. 6, in yet another embodiment each trigger portion 11 includes a primary trigger switch 111 and a plurality of secondary trigger switches 112 that are electrically connected to each other. The elastic support member 4 corresponding to each trigger portion 11 has a plurality of contact portions 41 and 42 corresponding respectively to the primary trigger switch 111 and the secondary trigger switches 112. Furthermore, the contact portion 41 corresponding to the primary trigger switch 111 can be designed at a length longer than other contact portions 42. Such a design can prevent trigger failure of the trigger portion 11 due to skewed movement of the keycap 23 caused by improper force applying of the users.

As a conclusion, the thin keyboard depressing structure of the invention includes a circuit board and a frame. The circuit board has a plurality of trigger portions to receive contact and generate keyboard signals. The frame is stacked over the circuit board and integrally formed an outer frame, a plurality of inner frames and a plurality of keycaps. The outer frame has a plurality of holding zones corresponding to the trigger portions. Each keycap is corresponding to one trigger portion and located in one holding zone. The outer frame and the keycap are bridged by each inner frame. Each inner frame has at least two first connecting portions connected to the outer frame and at least two second connecting portions connected to the keycap, and each first connecting portion and each second connecting portion are bridged by a support portion which can generate a deformation elastic force when the keycap is moved to the trigger portion. Thus, the keycap link movement member used in the conventional keyboard can be dispensed with, and the total thickness of the keyboard can be reduced to make the keyboard thinner without being constrained by the height of the keycap link movement member.

What is claimed is:

1. A thin keyboard having keycaps including integrated inner frames, comprising:
 a circuit board including a plurality of trigger portions each being triggerable to generate a keyboard signal; and
 a frame which is stacked over the circuit board and forms an outer frame, a plurality of inner frames and a plurality of keycaps in an integrated manner, the outer frame including a plurality of holding zones corresponding to the trigger portions, each keycap being located in one holding zone corresponding to one trigger portion, the outer frame and each keycap being bridged by one inner frame, each inner frame including at least two first connecting portions connected to the outer frame and at least two second connecting portions connected to a respective keycap, each first connecting portion and each second connecting portion being bridged by a support portion which generates a deformation elastic force when a respective keycap is moved to a respective trigger portion.

2. The thin keyboard having keycaps including integrated inner frames of claim 1, wherein the keycaps are held horizontally or vertically in the holding zones, and the frame includes a support rib to bridge two abutting holding zones.

3. The thin keyboard depressing structure of claim 1, wherein the two first connecting portions are located at two opposite sides of each keycap and the two second connecting portions are located at two other opposite sides of each keycap.

4. The thin keyboard having keycaps including integrated inner frames of claim 3, wherein each first connecting portion is formed at a width gradually increased from the junction of the first connecting portion and the outer frame towards a respective support portion.

5. The thin keyboard having keycaps including integrated inner frames of claim 4, wherein each second connecting portion is formed at a width gradually shrunk from the junction of the second connecting portion and the support portion towards each keycap.

6. The thin keyboard having keycaps including integrated inner frames of claim 1, wherein each second connecting portion is formed at a width gradually shrunk from the junction of the second connecting portion and the support portion towards each keycap.

7. The thin keyboard having keycaps including integrated inner frames of claim 1, wherein each first connecting portion is located at one side of a respective keycap, each second connecting portion being located at one corner of a respective keycap.

8. The thin keyboard having keycaps including integrated inner frames of claim 1, wherein each support portion of a respective inner frame is formed corresponding to the profile of a respective keycap.

9. The thin keyboard having keycaps including integrated inner frames of claim 1, wherein each first connecting portion and each second connecting portion are located at a same elevation.

10. The thin keyboard having keycaps including integrated inner frames of claim 1, wherein each keycap and the circuit board are interposed by a movement interval which includes an elastic support member to aid movement of the keycap relative to the circuit board.

11. The thin keyboard having keycaps including integrated inner frames of claim 10, wherein each trigger portion includes a primary trigger switch and a plurality of secondary trigger switches that are electrically connected to each other, and the elastic support member includes a plurality of contact portions corresponding respectively to the primary trigger switch and the secondary trigger switches.

\* \* \* \* \*